United States Patent
Zhang et al.

(10) Patent No.: US 7,791,903 B2
(45) Date of Patent: Sep. 7, 2010

(54) DC-DC FLYBACK CONVERTER HAVING A SYNCHRONOUS RECTIFICATION SELF-DRIVEN CIRCUIT

(75) Inventors: Congfeng Zhang, Hangzhou (CN); Hao Zhang, Hangzhou (CN); Guichao Hua, Hangzhou (CN)

(73) Assignee: Bel Power (Hangzhou) Co., Ltd. (CN)

( * ) Notice: Subject to any disclaimer, the term of this patent is extended or adjusted under 35 U.S.C. 154(b) by 357 days.

(21) Appl. No.: 11/561,937

(22) Filed: Nov. 21, 2006

(65) Prior Publication Data

US 2007/0121351 A1     May 31, 2007

(30) Foreign Application Priority Data

Nov. 28, 2005   (CN) .................... 2005 1 0061738

(51) Int. Cl.
*H02M 3/335*   (2006.01)
(52) U.S. Cl. ........................ 363/16; 363/127
(58) Field of Classification Search ............ 363/78–81, 363/89, 95, 97; 323/282–285
See application file for complete search history.

(56) References Cited

U.S. PATENT DOCUMENTS

| | | | | |
|---|---|---|---|---|
| 5,196,784 A | * | 3/1993 | Estes, Jr. ................. | 324/117 R |
| RE37,510 E | * | 1/2002 | Bowman et al. .............. | 363/15 |
| 6,961,253 B1 | * | 11/2005 | Cohen ......................... | 363/89 |

* cited by examiner

*Primary Examiner*—Rajnikant B Patel
(74) *Attorney, Agent, or Firm*—Ostrolenk Faber LLP (57) ABSTRACT

A DC-DC flyback converter, includes a three-winding transformer; a primary power circuit having a first MOSFET connected to a first winding of the transformer; a secondary power circuit connected to a second winding of the transformer terminals; and a self-driven circuit connected to a third winding of the transformer. The secondary power circuit includes a synchronous rectifier in the form of a second MOSFET and the self-driven circuit further includes a delay drive circuit, an isolation differential circuit, a negative removal circuit having a third MOSFET and a synchronous rectifier trigger switch-off circuit for switching the synchronous rectifier to an off condition.

12 Claims, 9 Drawing Sheets

DC-DC FLYBACK CONVERTER HAVING A SYNCHRONOUS RECTIFICATION SELF-DRIVEN CIRCUIT

FIELD OF THE INVENTION

The present invention relates to high power density power supplies with high current and low output voltage. More specifically, it relates to flyback DC-DC converters having novel synchronous rectification self-driven circuits.

BACKGROUND OF THE INVENTION

With the rapid development of semiconductors and ultra large-scale IC, the demand for low cost isolated dc-dc converters with high current and low voltage has increased greatly. However, the conduction loss of the Schottky diode with a forward conduction voltage of approximately 0.3V has become a bottleneck in miniaturizing these converters and in improving their thermal performance. Output synchronous rectification has proven to be the only way to enhance the converter's reliability. While the gate of the synchronous rectifier needs to be oscillated by a corresponding drive circuit, the control of the drive circuit normally requires very good sequencing to prevent the cross conduction between a primary side MOSFET and a secondary synchronous rectification MOSFET.

Figure 1:
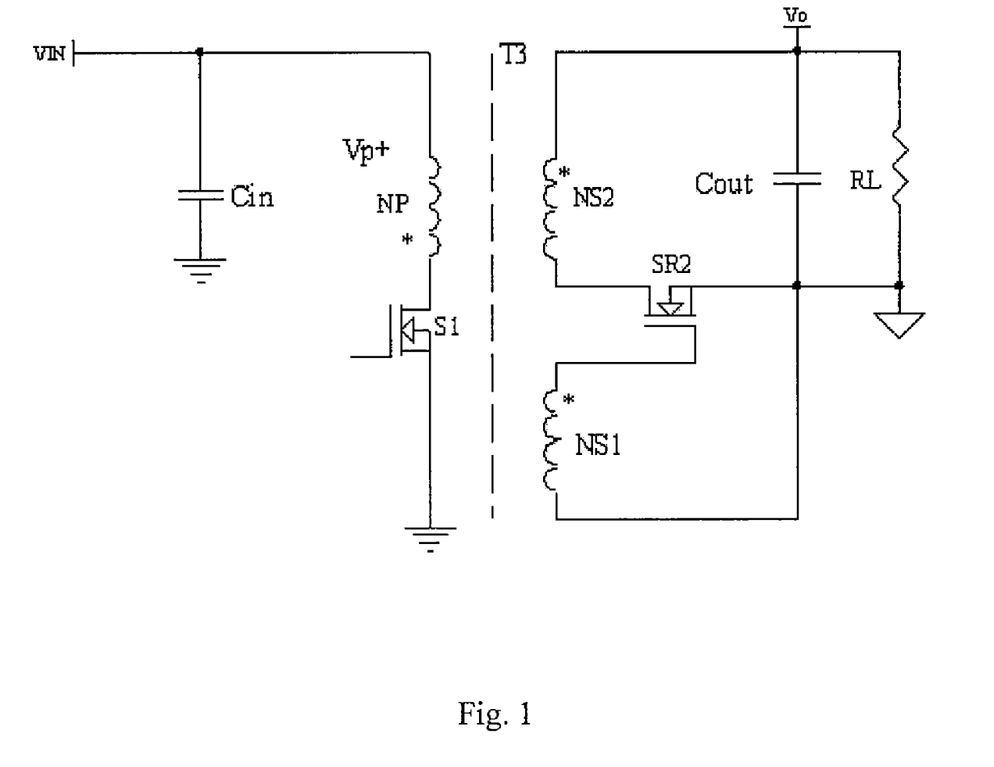
FIG. 1 is a schematic of a prior art self-driven circuit for synchronous rectifier of flyback converter.

Generally speaking, there are two ways to drive the synchronous rectifier MOSFET: self-driven and externally-driven. The self-driven scheme is widely used for its low cost and flexibility. But for flyback converters, existing self-driven circuits are often too complex to be widely adopted in practical applications. Meanwhile, the application of some self-driven converters is greatly restricted because of difficulties in controlling the cross conduction, or the driver voltage between the gate and source of the synchronous rectifier MOSFET. For example, the self-driven technology shown in FIG. 1 uses an external auxiliary winding NS1 to drive the synchronous rectifier SR2. When S1 is turned off, the voltages of the secondary windings NS1 and NS2 reverse polarity, then SR2 will be turned on and the secondary winding NS2 of the transformer will start to provide energy to the load; when S1 is turned on, the voltages of the secondary windings NS1 and NS2 will reverse polarity, and SR2 will turn off when its gate voltage is lower than its gate driver threshold. This will generate a negative pulse voltage at the gate and source of SR2. This negative voltage is in direct ratio to Vin and will ramp up significantly when Vin is high, and, in the worst case, will result in permanent damage to S1 or SR2. Even if the converter functions properly, it will be hard to improve the efficiency of the converter because the loss in the driven circuit of the synchronous rectifier will be greatly increased as the input voltage increases.

Figure 2A:
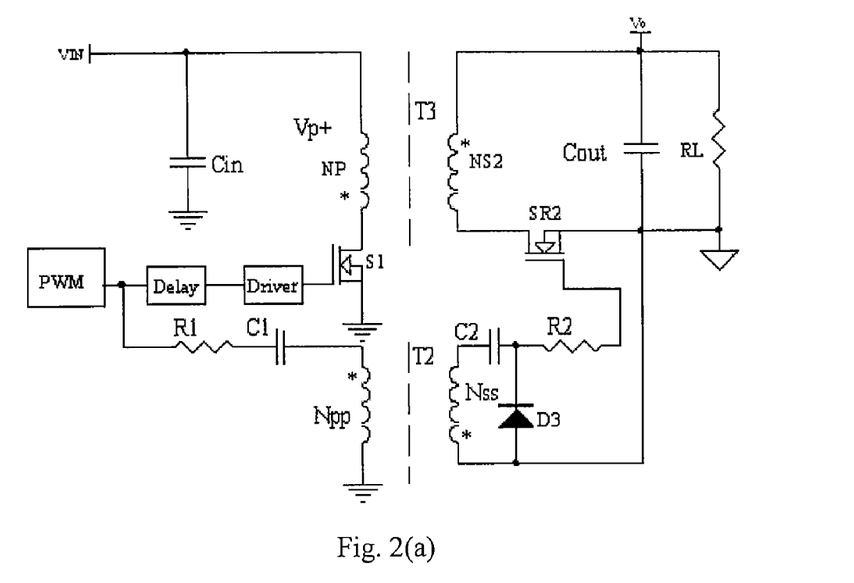
FIG. 2(a) is a schematic of another embodiment of a prior art self-driven circuit for synchronous rectifier of flyback converter.
Figure 2B:
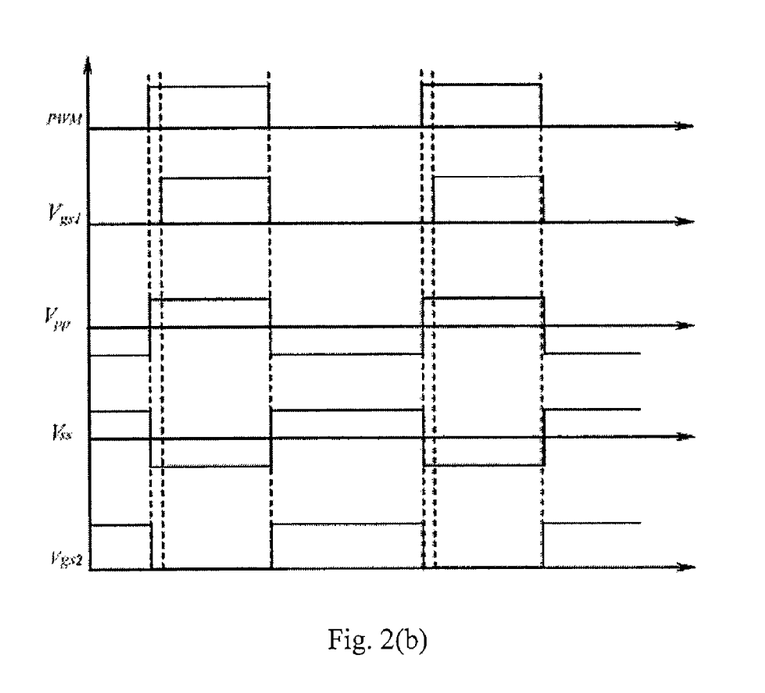
FIG. 2(b) illustrates waveforms of key points in the circuit shown in FIG. 2(a)

The self-driven technology shown in FIG. 2(a) is a self-driven circuit commonly used in synchronous rectifiers in flyback converters. This circuit consists of a primary power circuit, a secondary circuit, a self-driven circuit and a PWM controller. The primary circuit includes a main power MOSFET S1, the primary winding NP of the transformer and an input capacitor Cin. The secondary circuit includes the secondary winding Ns of the transformer, a rectifier SR2 and an output capacitor Cout. The self-driven circuit consists of diode D3, capacitor C2, resistor R2, an isolated drive transformer T2, capacitor C1, resistor R1 and a delay drive circuit. The delay drive circuit is made up of a delay circuit and a drive circuit. One way of forming the delay circuit is to have a diode connected with a resistor in parallel and then connected to the ground capacitor in series.

When the PWM signal from the controller changes from low to high, the signal after being operated on by the differentiating circuit comprised of R1 and C1 in series, will make the Npp end of the isolation drive transformer T2's primary winding Npp positive; hence the secondary winding Nss of T2 will be positive at the dot end, i.e. the dot-end is positive. This will turn on D3 and charge C2 up. As a result, the synchronous rectifier MOSFET SR2 will be turned off. After the PWM signal is delayed by the delay circuit, it will turn on S1 to store energy into the transformer T3. When the PWM signal changes from high to low, the Npp end of the isolated drive transformer T2's primary winding Npp will be negative at the dot-end, i.e. the dot-end is negative. This will result in the dot-end of Nss being negative. This, in turn, will result in D3 turning off causing the synchronous rectifier SR2 to be turned on. The energy stored in transformer T3 is transferred to the load through the secondary winding NS2 and the synchronous rectifier SR2. In the design of FIG. 2(a), the output self-driven circuit must have a bulky isolation drive transformer. This will make it hard to achieve high power density. On the occasions, where high voltage isolation is required for the primary and secondary windings, such a self-driven circuit will cause hindrance to the isolation. Meanwhile, because there is high leakage inductance of the self-driven transformer under this circumstances, the voltage spike of the drive wave transmitted to the secondary winding will be very high, which is very likely to break down the gate of the synchronous rectifier.

SUMMARY OF THE INVENTION

The object of the present invention is to solve the foregoing and other issues with the self-driven technology commonly used in existing flyback converters, by providing a DC-DC converter having a self-driven circuit which enables a transformer with simpler structure, lower cost and lower cross conduction loss to be used and which is particularly suitable for a self-driven circuit with multiple outputs, and without negative voltage between the synchronous rectifier's gate and source.

The present invention uses some low power R, C components, diodes, b-polar transistors and MOSFETs to implement the equivalent self-driven technology for synchronous rectifiers. Such a technology guarantees reliable switch-on and switch-off of the synchronous rectifiers and reduces the loss of cross conduction to a minimum, thus achieving higher efficiency when it is used in low voltage, high current applications.

Other features and advantages of the present invention will become apparent from the following description of the invention which refers to the accompanying drawings.

DETAILED DESCRIPTION OF THE PREFERRED EMBODIMENT(S)

Figure 3A:
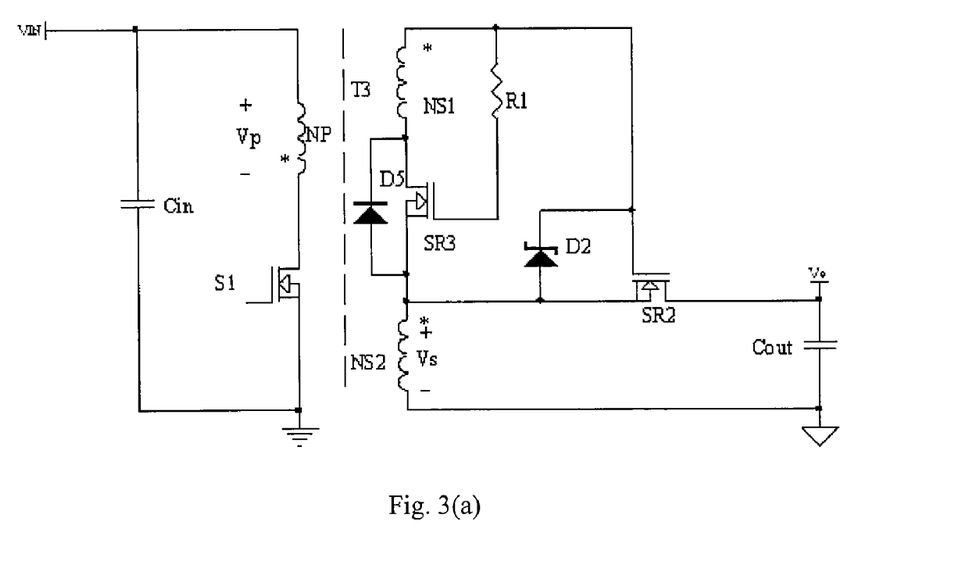
FIG. 3(a) is a schematic of an embodiment of a self-driven circuit for a synchronous rectifier utilizing a first type of control method in accordance with certain features of the present invention.

Referring to FIG. 3(a), a flyback converter employing the first type of self-driven circuit for the synchronous rectifier in accordance with the present invention includes a primary power circuit, a secondary power circuit and a self-driven circuit. The primary power circuit includes a main power MOSFET S1, a primary winding NP of the transformer and an input capacitor Cin. The secondary power circuit includes a secondary winding NS2 of the transformer, a rectifier SR2 and an output capacitor Cout. The self-driven circuit mainly consists of a negative voltage removal circuit and a synchronous rectifier trigger switch-off circuit. The negative voltage removal circuit is formed by an N channel MOSFET SR3 and a resistor R1, while the synchronous rectifier trigger switch-off circuit is made up of MOSFET SR3, winding NS1 and Zener diode D2. The drive voltage of the synchronous rectifier is mainly generated by adjusting the turns ratio of NS1 and NS2. In the negative voltage removal circuit, the SOURCE of SR3 is connected with that of the synchronous rectifier MOSFET SR2, while the DRAIN pin of SR3 is connected with the non-dot end of the drive winding NS1, and its gate is connected with resistor R1. In the synchronous rectifier switch-off circuit, the dot-end of winding NS1 is connected with R1 and the gate of SR2, while another end of the winding is connected with the DRAIN of SR3. A bi-polar transistor may be substituted for the N channel MOSFET in the negative voltage removal circuit and the synchronous rectifier trigger switch-off circuit, but the emitter and collector of the transistor should be paralleled with a diode with the anode of the diode connected to the emitter of the transistor, and the cathode connected to the collector.

Figure 3B:
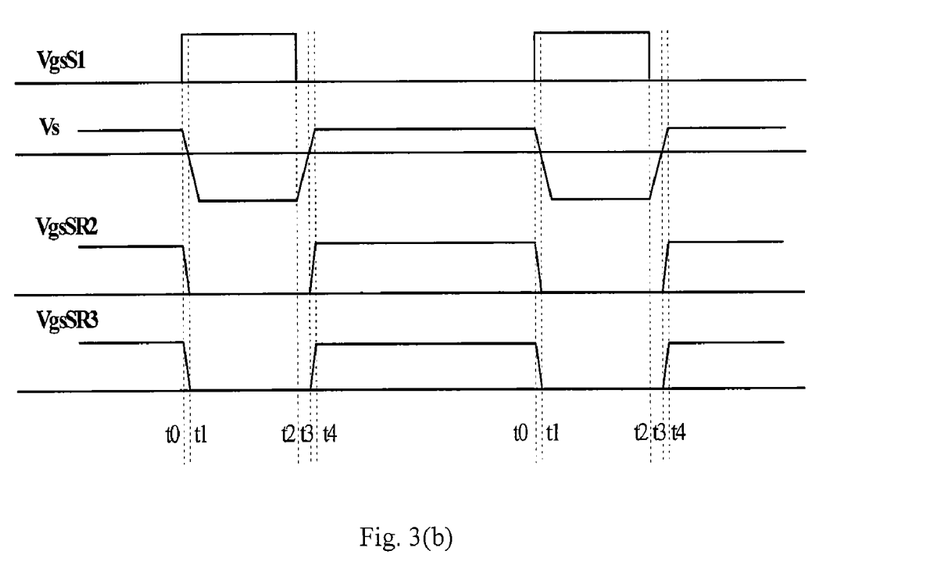
FIG. 3(b) illustrates the sequence waveforms of key points in the circuit shown in FIG. 3(a)

The working principle of the above-mentioned self-driven circuit and negative removal circuit of the synchronous rectifier is as following:

When adopting the self-driven circuit as shown in FIG. 3(a), the typical working waveforms of the voltages and currents can be as illustrated in FIG. 3(b). When t=t0, the PWM signal from the control IC changes from low to high, the drive circuit will charge the Cgs1 of S1. When VgsS1 exceeds the threshold voltage of S1, S1 will be turned on and will make the dot-end of primary winding NP negative; thus the voltages of secondary windings NS1 and NS2 will reverse polarity and their dot-ends will be negative. Then the gate of synchronous rectifier SR2 will be discharged through Zener diode D2, SR3 and winding NS1. When Vgs of SR2 is lower than the threshold voltage of SR2, synchronous rectifier SR2 will be turned off and the discharge process will end when t=t1. Since the gate of SR3 is connected with a resistor R1 in series, the discharge velocity of the gate of SR3 is a little slower than that of SR2, so the Vgs voltage of SR3 falls to lower than the threshold voltage and turns off the auxiliary rectifier SR3, interrupting the bias generated by NS1 between the Gate and Source of SR2. During the period from t1 to t2, the switching tube S1 on the primary side will remain on completely and begin to store the energy into the transformer, while the output capacitor will provide power supply to the load.

When t=t2, the PWM signal changes from high to low, the drive circuit starts to discharge the Cgs of S1, and the voltage of the primary winding NP of the transformer begins to reverse, and consequently, the voltages of the secondary winding NS1 and NS2 begin to backswing. When t=t3, the voltages of the secondary windings NS1 and NS2 exceed 0, turning to forward voltages that increase gradually. Then the energy stored in the transformer is provided to the load through the secondary winding NS2 and the synchronous rectifier SR2. When Vgs of SR3 is lower than the threshold voltage of SR3, SR3 will start to charge the gate of SR2 through the diode in SR3. When the gate drive voltage Vgs of SR2 exceeds the threshold voltage, SR2 will be turned on, and the synchronous rectifier in the converter will be in a synchronous rectification mode. In such charge process, both SR2 and SR3 change from the diode operation mode to MOSFET operation mode. Therefore, the switch-on of both SR2 and SR3 are achieved with zero voltage. And similarly, because the gate of SR3 is connected with R1 in series, SR3 will also be turned on a little later than SR2. When t=t4, the charge of Cgs of SR2 ends, and after the synchronous rectifier SR2 and auxiliary rectifier SR3 are turned on, the winding NS1 will provide power to maintain the drive voltage.

From the above described working principle, the synchronous rectifier SR2 is driven in a passive way, i.e. only when S1 is turned on, will SR2 be turned off, only when S1 is turned off, will SR2 be turned on. When S1 is on, but SR2 hasn't been turned off, the cross conduction loss will be incurred. However, the duration of the cross conduction can be adjusted by the secondary drive circuit, bringing down the cross conduction loss to the lowest and improving the efficiency of the transformer. More importantly, the control of such a drive circuit to interrupt the bias voltage in synchronous rectifiers is very simple, which removes complicated peripheral circuits from the drive circuit, saving space in the limited area of PCB significantly and lowering the cost to a great extent.

Figure 4A:
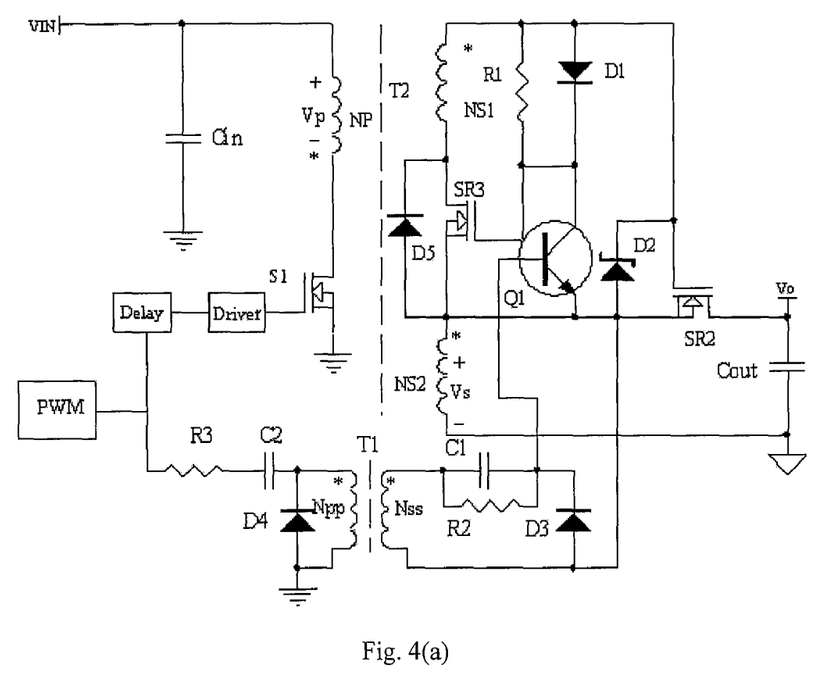
FIG. 4(a) is a schematic of an embodiment of a self-driven circuit for a synchronous rectifier utilizing a second type of control method in accordance with certain features of the present invention.

FIG. 4(a) shows a flyback converter employing the second type of self-driven circuit for the synchronous rectifier in accordance with the invention. The flyback converter includes a primary power circuit, a secondary power circuit and a self-driven circuit. The primary power circuit includes main power MOSFET S1, the primary winding NP of a transformer and an input capacitor Cin, whereas the secondary power circuit includes the secondary winding NS2 of the transformer, a rectifier SR2 and an output capacitor Cout. The self-driven circuit consists of a delay drive circuit, an isolation differential circuit, a synchronous rectifier trigger switch-off circuit and a bias interruption circuit. The delay drive circuit includes a delay circuit and a drive circuit-one example of the delay circuit is having a diode parallel connected with a resistor and then connected to a ground capacitor in series. The isolation differential circuit is formed by a drive transformer, a capacitor, a resistor and a diode. The transformer includes a primary winding Npp and a secondary winding Nss. The synchronous rectifier trigger switch-off circuit includes a bi-polar transistor Q1, a capacitor C1, a resistor R2 and a diode D3. The negative voltage removal circuit consists of an N channel MOSFET SR3, a Zener Diode D2 and a resistor R1.

The delay drive circuit is connected with the isolation differential circuit. One end of the isolation differential circuit is connected with the anode of the diode in the synchronous rectifier trigger switch-off circuit; the other end of the isolation differential circuit is connected with the base of the transistor Q1 in the synchronous rectifier trigger switch-off circuit. The SOURCE of SR3 in the negative voltage removal circuit is connected with the source of the synchronous rectifier, while its DRAIN is connected with the non-dot-end of the winding NS1, and its gate with resistor R1. In the synchronous rectifier trigger switch-off circuit, the dot-end of winding NS1 is connected with R1, while the collector of Q1 is connected with the gate of SR3, and the emitter with the source of the synchronous rectifier SR2. A bi-polar transistor, whose emitter and collector are connected with a diode with the anode of the diode connected with the emitter of the transistor, and the cathode connected with the collector can be substituted for the N channel MOSFET in the bias interruption circuit and the synchronous rectifier trigger switch-off circuit.

Figure 4B:
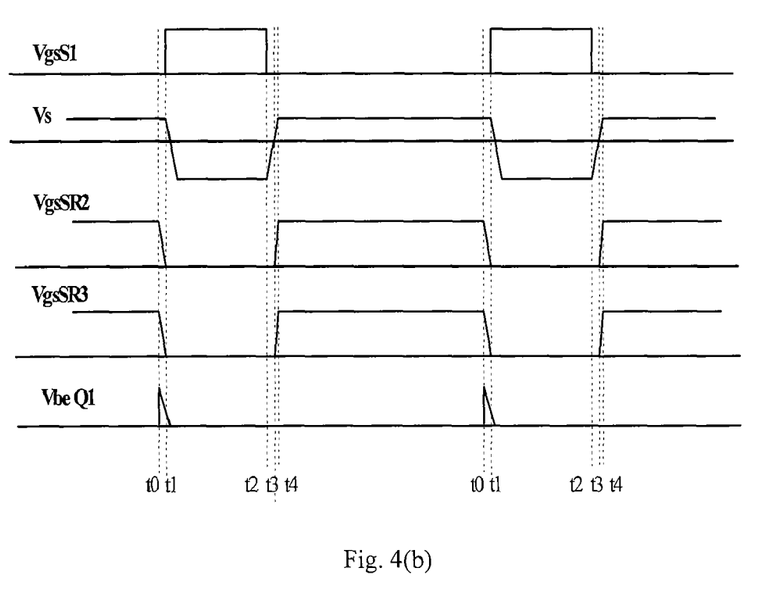
FIG. 4(b) illustrates the waveforms of key points in the circuit shown in FIG. 4(a)

The typical working waveforms of the converter of FIG. 4(a) are illustrated in FIG. 4(b). The function of the delay drive circuit is to make the synchronous rectifier on the secondary side turn off slightly ahead of the turning on of the main MOSFET on the primary side, controlling the delay time to the optimum, and thereby provide the transformer with the highest efficiency. The turn-on of the synchronous rectifier can be achieved by the auxiliary winding and by turning off the MOSFET, while the turn-off of it is achieved by the delay drive circuit, the isolated differential circuit and negative voltage removal circuit. The evident differences between this circuit and that shown in FIG. 3(a) are: 1) some small auxiliary circuits are added; 2) the dead time of the cross conduction can be adjusted; 3) the optimizing of the main power stage is more flexible; 4) it is suitable for the synchronous control of multi-output applications.

Figure 5A:
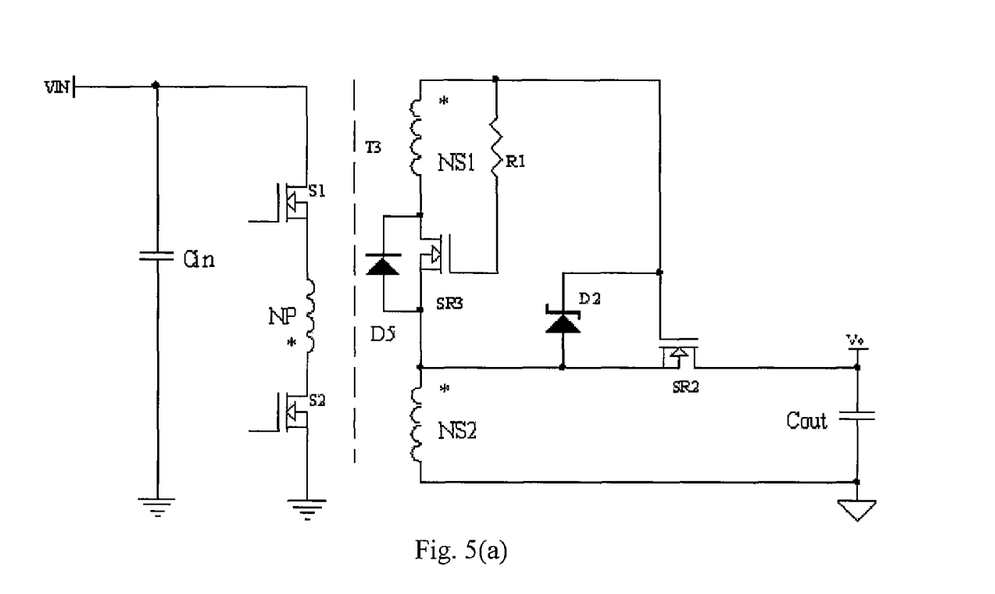
FIG. 5(a) is a schematic of the application of the first type of self-driven circuit covered by the present invention in a dual flyback circuit.
Figure 5B:
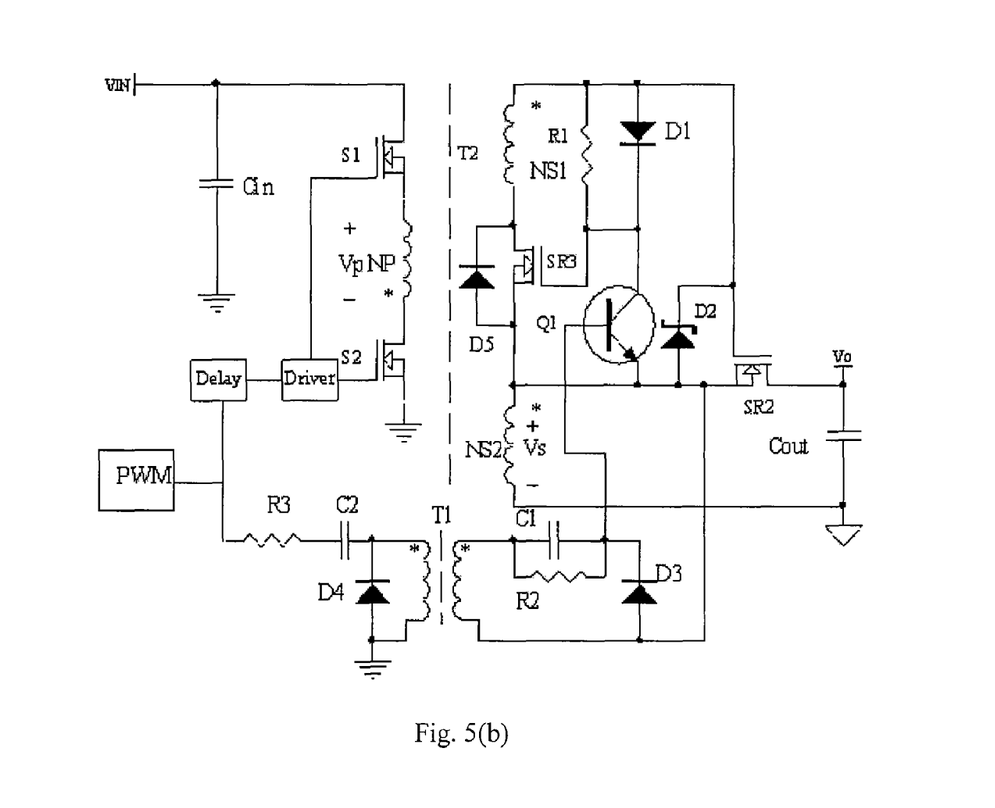
FIG. 5(b) is a schematic of the application of the second type of self-driven circuit covered by the present invention in a dual flyback circuit.

By extending the technologies shown in FIG. 3(a) and FIG. 4(a), we can get some other embodiments as shown in FIG. 5 to FIG. 9. Their features are as following:

FIGS. 5(a) and 5(b) show a dual flyback dc/dc converter. The primary side of the circuit has power MOSFET S1, S2 and a winding NP. The dot-end of the winding NP is connected with the DRAIN of the power MOSFET S2, while its non-dot end is connected with the SOURCE of the power MOSFET S1. The delay drive circuit is connected respectively with the gates of the power MOSFET S1 and S2.

Figure 6A:
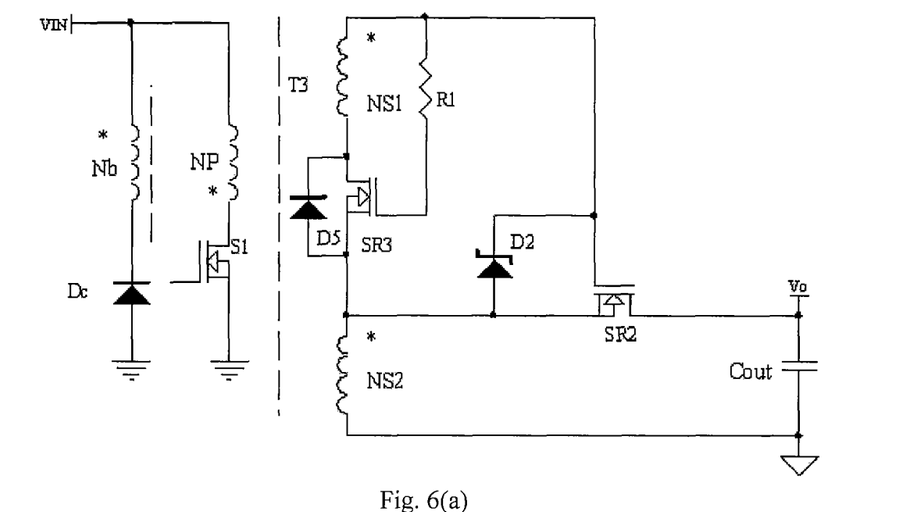
FIG. 6(a) is a schematic of the application of the first type of self-driven circuit covered by the present invention in a three-winding clamp circuit.
Figure 6B:
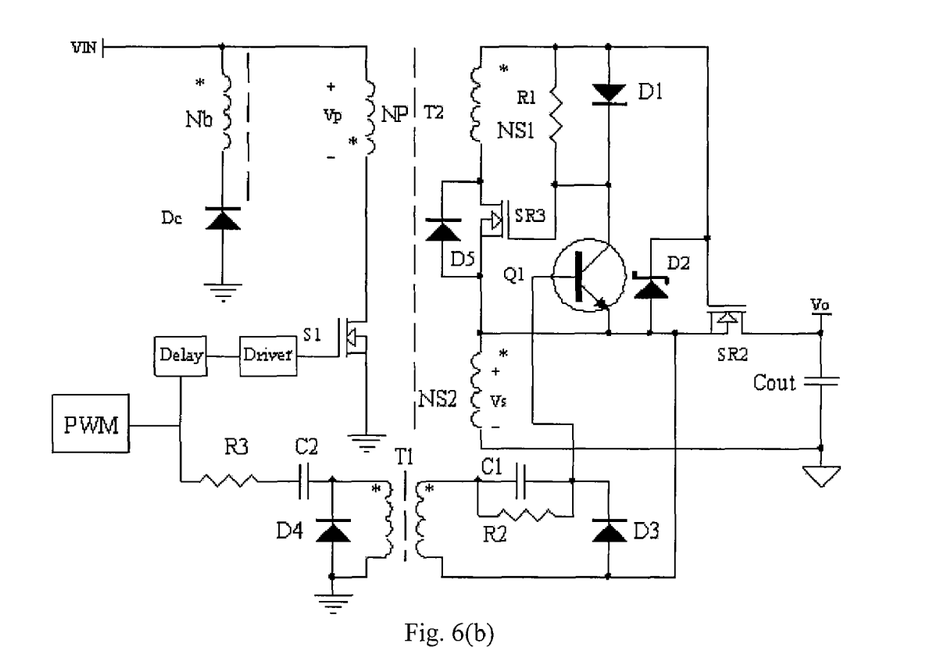
FIG. 6(b) is a schematic of the application of the second type of self-driven circuit covered by the present invention in a three-winding clamp circuit.

FIGS. 6(a) and 6(b) shows a clamp flyback dc/dc converter with three windings, i.e. Nb, NP, NS1 and NS2. The primary side of the circuit has windings Nb and NP, a power MOSFET S1 and a diode Dc, with the dot-end of winding NP connected with the DRAIN of power MOSFET S1, and the non-dot-end of winding Nb connected with the cathode of diode Dc. The delay drive circuit is connected with the gate of power MOSFET S1.

Figure 7A:
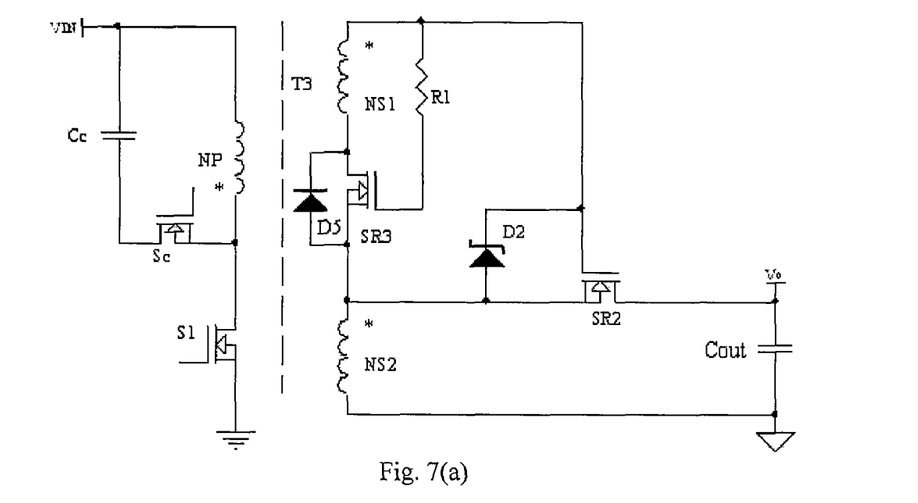
FIG. 7(a) is a schematic of the application of the first type of self-driven circuit covered by the present invention in an active clamp circuit.
Figure 7B:
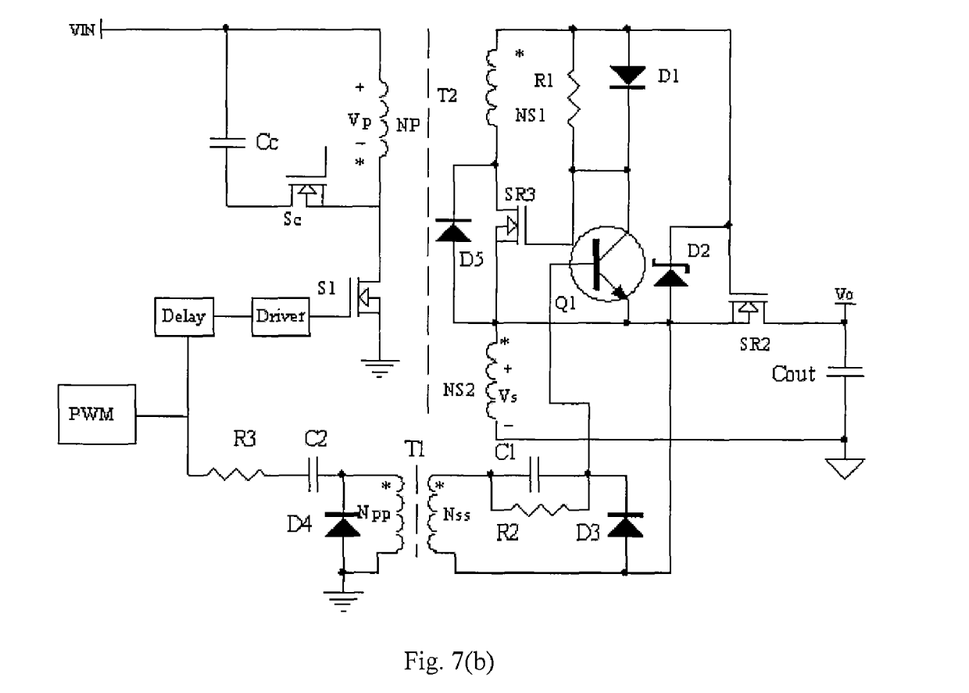
FIG. 7(b) is a schematic of the application of the second type of self-driven circuit covered by the present invention in an active clamp circuit.

FIGS. 7(a) and 7(b) show an active clamp flyback dc/dc converter. The primary side of the circuit has a winding NP, power MOSFET S1, Sc and a capacitor Cc, with the non-dot-end of the winding NP connected with the DRAIN of the power MOSFET S2 via capacitor Cc, and the source of the MOSFET Sc connected with the DRAIN of the power MOSFET S1 as well as the dot-end of the winding NP. The delay drive circuit is connected with the gate of the MOSFET S1.

Figure 8A:
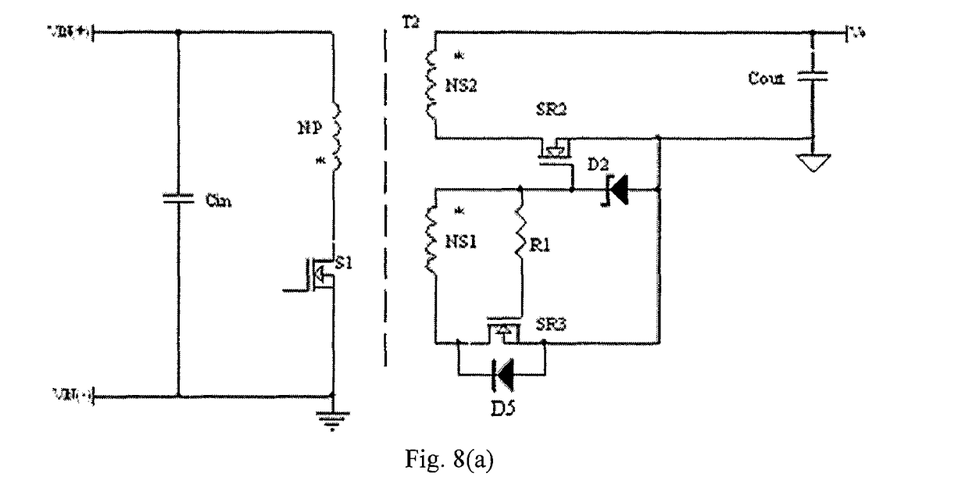
FIG. 8(a) is a schematic of the extended embodiment of the first controlling method covered by the present invention, connecting the synchronous rectifier to the ground wire to achieve the control more easily.

FIG. 8(a) is an extended embodiment of the first type of controlling method covered by the present invention. It connects the synchronous rectifier to ground to achieve more easily control.

Figure 8B:
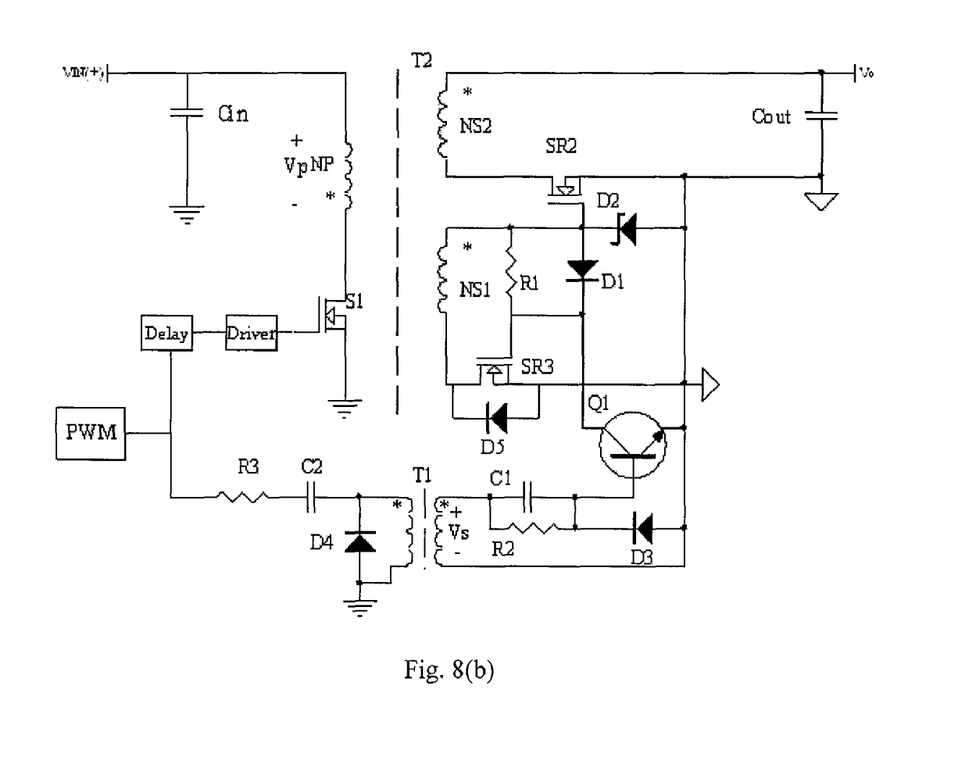
FIG. 8(b) is a schematic of the extended embodiment of the second controlling method covered by the present invention, connecting the synchronous rectifier to the ground wire and adding a discharge loop onto the G pole of SR3 for controlling the turn-on and turn-off of S3 to achieve better control of the cross conduction loss and negative voltage.

FIG. 8(b) is an extended embodiment of the second type of controlling method covered by the present invention. It connects the synchronous rectifier to ground and breaks the signals through the primary transmission to achieve the control of the turn-off of the synchronous rectifier more easily, and thus achieve better control of the cross conduction loss and negative voltage.

Figure 9A:
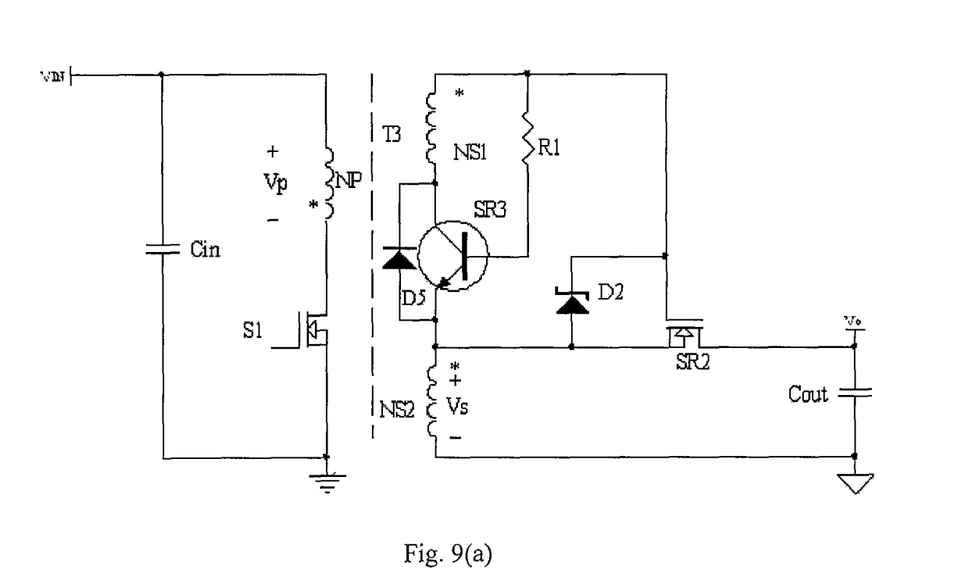
FIG. 9(a) is a schematic of a low cost solution for the first type of self-driven circuit covered by the present invention.

FIG. 9(a) is a low cost solution for the second type of control method covered by the present invention. In such a scheme, a bi-polar transistor is substituted for the MOSFET in the negative voltage removal circuit, which results in lower cost.

Figure 9B:
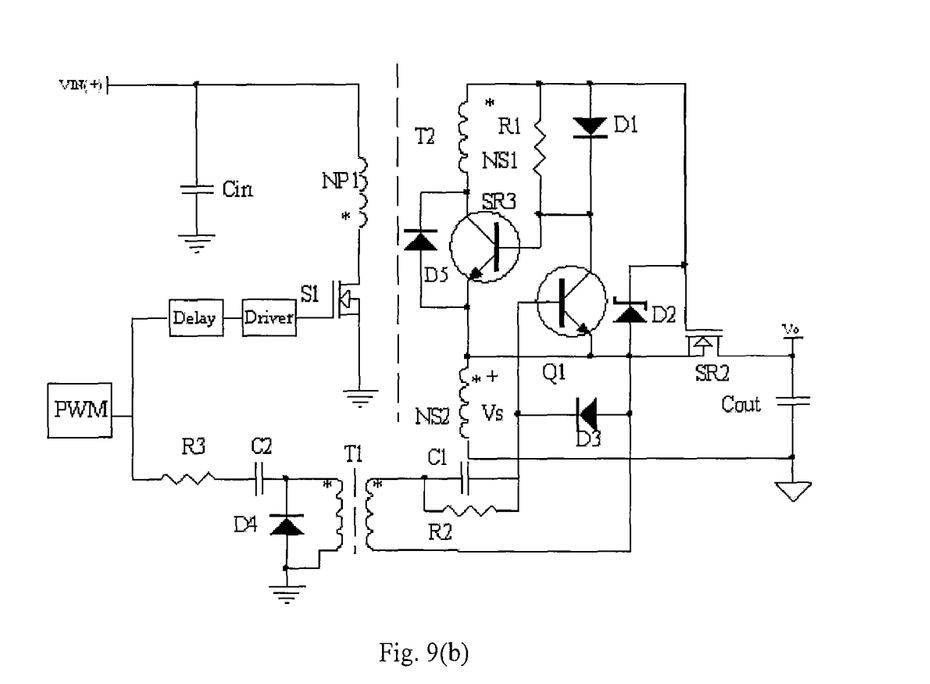
FIG. 9(b) is a schematic of a low cost solution for the second type of self-driven circuit covered by the present invention.

FIG. 9(b) is a low cost solution for the second type of control method. In such a scheme, a bi-polar transistor substitutes for the MOSFET in the negative voltage removal circuit, which results in lower cost.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A DC-DC flyback converter, which comprises:
   a three-winding transformer;
   a primary power circuit including a first MOSFET connected to a first winding of the transformer;
   a secondary power circuit connected to a second winding of the transformer, the secondary power circuit further including a synchronous rectifier comprising a second MOSFET having first and second output terminals; and
   a self-driven circuit including connected to a third winding of the transformer, wherein the self-driven circuit further includes a negative voltage removal circuit for removing negative voltage between the output terminals of the synchronous rectifier and a synchronous rectifier trigger switch-off circuit for switching the synchronous rectifier to an off condition, wherein the negative voltage removal circuit is formed by a third MOSFET and a resistor, while the synchronous rectifier trigger switch-off circuit includes the third MOSFET, the second winding of the transformer and a Zener diode.

2. A DC-DC flyback converter in accordance with claim 1, wherein the second and third MOSFETs are an N-channel MOSFETs.

3. A DC-DC flyback converter in accordance with claim 1, wherein in the negative voltage removal circuit, the SOURCE of the third MOSFET is connected with the source of the second MOSFET, while the DRAIN of the third MOSFET is connected with the non-dot end of the second winding of the transformer and the gate of the second MOSFET is connected with resistor R1.

4. A DC-DC fly back converter in accordance with claim 3, wherein the dot-end of the second winding of the transformer is connected with R1 and the gate of the third MOSFET, while the non dot-end of the winding is connected with the DRAIN of the third MOSFET.

5. A DC-DC flyback converter, which comprises:
a three-winding transformer;
a primary power circuit including a first MOSFET connected to a first winding of the transformer;
a secondary power circuit connected to a second winding of the transformer, the secondary power circuit further including a synchronous rectifier having first and second output terminals, the synchronous rectifier being a second MOSFET; and
a self-driven circuit including a third MOSFET connected to a third winding of the transformer, wherein the self-driven circuit further includes a delay drive circuit, an isolation differential circuit, a negative voltage removal circuit and a synchronous rectifier trigger switch-off circuit for switching the synchronous rectifier to an off condition, wherein the delay drive circuit includes a delay circuit and a drive circuit.

6. A DC-DC flyback converter in accordance with claim 5, wherein the isolation differential circuit includes a drive transformer, a capacitor, a resistor and a diode, the drive transformer including a primary winding and a secondary winding.

7. A DC-DC flyback converter in accordance with claim 5, wherein the synchronous rectifier trigger switch-off circuit includes a bi-polar transistor, a capacitor, a resistor and a diode.

8. A DC-DC flyback converter in accordance with claim 5, wherein the negative voltage removal circuit includes the third MOSFET, a Zener Diode and a resistor.

9. A DC-DC flyback converter in accordance with claim 5, wherein the delay drive circuit is connected with the isolation differential circuit, one end of the isolation differential circuit is connected with the anode of the diode in the synchronous rectifier trigger switch-off circuit and the other end of the isolation differential circuit is connected with the base of the transistor in the synchronous rectifier trigger switch-off circuit.

10. A DC-DC flyback converter in accordance with claim 9, wherein the SOURCE of the third MOSFET in the negative voltage removal circuit is connected with the SOURCE of the second MOSFET, while the DRAIN of the third MOSFET is connected with the non-dot-end of the second winding, and the GATE of the third MOSFET is connected with a resistor.

11. A DC-DC flyback converter in accordance with claim 10, wherein in the synchronous rectifier trigger switch-off circuit, the dot-end of the third winding is connected with the resistor, while the collector of the transistor is connected with the GATE of the third MOSFET, and the emitter of the transistor is connected with the SOURCE of the second MOSFET.

12. A DC-DC flyback converter, which comprises:
a three-winding transformer;
a primary power circuit connected to a first winding of the transformer, wherein the primary power circuit further includes a first MOSFET, and an input capacitor;
a secondary power circuit connected to a second winding of the transformer, the secondary power circuit further including a second MOSFET and an output capacitor; and
a self-driven circuit connected to a third winding of the transformer, wherein the self-driven circuit further includes a delay drive circuit, an isolation differential circuit, a synchronous rectifier trigger switch-off circuit, a negative voltage removal circuit including a third MOSFET, a Zener Diode and a resistor and a synchronous rectifier trigger switch-off circuit for switching the synchronous rectifier to an off condition.

\* \* \* \* \*